No. 883,422. PATENTED MAR. 31, 1908.
I. REINESS.
DEVICE FOR SECURING SCARF PINS.
APPLICATION FILED JULY 13, 1907.

Witnesses:
D. W. Gardner,
L. Mott

Inventor:
Israel Reiness
By his Attorney
Geo. Wm Miatt

UNITED STATES PATENT OFFICE.

ISRAEL REINESS, OF NEW YORK, N. Y.

DEVICE FOR SECURING SCARF-PINS.

No. 883,422.　　　　Specification of Letters Patent.　　Patented March 31, 1908.

Application filed July 13, 1907. Serial No. 383,564.

*To all whom it may concern:*

Be it known that I, ISRAEL REINESS, a citizen of the United States, residing in the borough of Manhattan, city, county, and State of New York, have invented certain new and useful Improvements in Devices for Securing Scarf-Pins, of which the following is a specification.

The object of my invention is to afford a simple, small, compact safety device for scarf and stick pins generally, one adapted to the requirements of various thicknesses of pins so that all sizes thereof may be effectually secured.

The invention consists in the specific construction and arrangement of parts hereinafter described and claimed, a distinguishing feature being the use in a device of this character of a laterally sliding gripping jaw having rigid angular bearing surfaces in contra-distinction to a rolling gripper, whereby the pin is more effectually pinched and held against withdrawal until the clutch is released.

Figure 1:
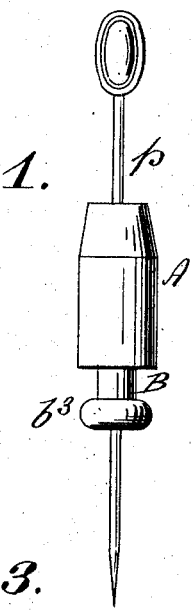
Figure 2:
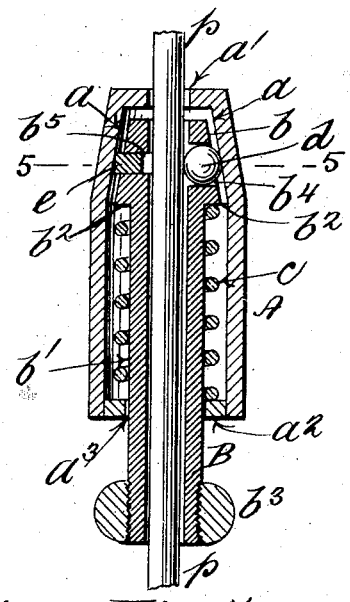
Figure 3:
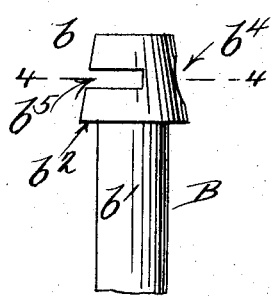
Figure 4:
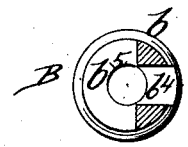
Figure 5:
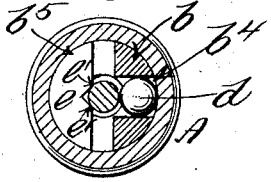
Figure 6:
Figure 7:
Figure 8:

In the accompanying drawings, Figure 1, is an elevation on an enlarged scale of my stick-pin retainer, applied to a pin; Fig. 2, is a central longitudinal sectional elevation thereof upon a still larger scale; Fig. 3, is an elevation of the inner end of the clutch tube; Fig. 4, a transverse section upon plane of line 4—4—Fig. 3, Fig. 5, a like section upon plane of line 5—5—Fig. 2; Figs. 6, 7, and 8, show several forms in which the clutch plate may be made.

The shell or casing A, which is circular in cross section is formed at its upper end with the internal conical surface $a$, and with end hole $a'$, for the passage of the pin $p$. Below the internal conical portion $a$, the casing is cylindrical, its lower end being closed by a disk $a^2$, formed with the central opening $a^3$, for the accommodation of the shank of the movable clutch tube B.

The latter is formed with a truncated conical head $b$, the base of which is of greater diameter than the shank $b'$, so as to afford an annular shoulder $b^2$, between which and the disk $a^2$, a spiral spring $c$, is interposed, as is usual in devices of this class. The lower or outer end of the shank $b'$, is provided with a knob or enlargement $b^3$, to facilitate manipulation. The disk $a^2$, is secured in position after the insertion of the clutch end of the tube B, within the shell; and the knob $b^3$, is secured to the outer end of the tube B, after the assembling of the parts.

The truncated conical head $b$, of the clutch B is formed with a recess $b^4$, on one side for the accommodation of a gripping device $d$, in the form of a ball, preferably, and on the other side with a lateral slot or recess $b^5$, for the accommodation of a slidable plate $e$. The plate $e$, is preferably flat, and the opposed parallel sides of the slot $b^5$, preferably extend at right angles to the longitudinal axis of the clutch tube.

The outer edge of the clutch plate $e$, is curved for contact with the inner conical surface $a$, of the shell A. Its inner edge may, if desired, be straight as shown in Fig. 7, but I prefer to form said inner edge with points or angles $e'$, $e'$, for contact with the pin $p$, when inserted in the device,—said angles $e'$, $e'$, being most effective in biting or pinching the cylindrical periphery of the pin $p$, when the clutch plate $e$, is forced inward by the inclined surface $a$, of the shell by reason of the pressure of the spring $c$, exerted against the truncated conical head of the clutch tube. The distinguishing feature of my clutch plate is this function of positive resistance or bearing as against the rolling contact of gripping devices heretofore used for this purpose; although as a matter of fact, I prefer to use both forms of gripping devices as shown in the drawings,—the ball $d$, opposed to my clutch plate $e$, making an ideal combination in that, as will be seen by reference to Fig. 5, the pin $p$, is held at three points on its periphery.

My improved safety device is applied and used in the same manner as other devices of this class, the main advantage afforded by my construction being the greater security afforded by my special form of gripping device.

I am aware that rollers and balls have been used as gripping devices in stick pin retainers, but these rotatable devices do not afford the security attained by my laterally slidable clutch plate with positive gripping edges which bite the cylindrical periphery of the pin.

What I claim as my invention and desire to secure by Letters Patent is,

1. As an improved article of manufacture, a stick pin retainer comprising a casing having a conical end, a movable clutch tube disposed axially within said casing and projecting through one end thereof and having a conical head conforming to the conical portion of the casing, said head being formed with diametrically disposed recesses, a rolling gripping device disposed in one of said recesses to engage the pin and the wall of the conical part of the casing, and a flat clutch plate disposed in the other recess for engaging the pin and the wall of the conical part of the casing, and a spring acting on the head of the tube to normally force it into the conical end of the casing.

2. As an improved article of manufacture, a stick pin retainer comprising a casing having a conical end, a movable clutch tube disposed axially within said casing and projecting through one end thereof and having a conical head conforming to the conical portion of the casing, said head being formed with diametrically disposed recesses, a rolling gripping device disposed in one of said recesses to engage the pin and the wall of the conical part of the casing, and a flat clutch plate disposed in the other recess for engaging the pin and the wall of the conical part of the casing, and a spring acting on the head of the tube to normally force it into the conical end of the casing, one of said recesses being vertically disposed and the other horizontally disposed with relation to the tube and extended inwardly beyond the axial center of the tube.

ISRAEL REINESS.

Witnesses:
   D. W. GARDNER,
   GEO. WM. MIATT.